(12) United States Patent
Kobayashi et al.

(10) Patent No.: US 8,094,285 B2
(45) Date of Patent: Jan. 10, 2012

(54) METHOD FOR MANUFACTURING A REFLECTION PLATE

(75) Inventors: Akio Kobayashi, Kanagawa (JP); Yasuki Kudo, Kanagawa (JP); Kenichirou Naka, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 49 days.

(21) Appl. No.: 12/797,056

(22) Filed: Jun. 9, 2010

(65) Prior Publication Data

US 2010/0248157 A1   Sep. 30, 2010

Related U.S. Application Data

(62) Division of application No. 11/878,205, filed on Jul. 23, 2007, now Pat. No. 7,773,173.

(30) Foreign Application Priority Data

Aug. 2, 2006   (JP) .................................. 2006-211256

(51) Int. Cl.
G02F 1/13 (2006.01)
G02F 1/1335 (2006.01)
B05D 5/06 (2006.01)
H01L 21/00 (2006.01)
G03F 7/20 (2006.01)

(52) U.S. Cl. .......... 349/187; 349/67; 349/113; 427/162; 438/30; 430/321

(58) Field of Classification Search .................. 349/187, 349/67, 61, 56, 113, 114, 15, 195; 438/30; 430/321; 427/162

See application file for complete search history.

(56) References Cited

U.S. PATENT DOCUMENTS

| 6,313,895 | B1 | 11/2001 | Tsuda et al. |
| 6,665,030 | B2 | 12/2003 | Hanazawa et al. |
| 7,612,847 | B2 | 11/2009 | Kanoh et al. |
| 7,773,173 | B2 * | 8/2010 | Kobayashi et al. ............. 349/67 |
| 2002/0113926 | A1 | 8/2002 | Hanazawa et al. |
| 2004/0239844 | A1 | 12/2004 | Kanoh et al. |
| 2008/0170180 | A1 | 7/2008 | Kobayashi et al. |
| 2010/0248157 | A1 * | 9/2010 | Kobayashi et al. ........... 430/321 |

FOREIGN PATENT DOCUMENTS

| CN | 1188248 | 7/1998 |
| CN | 1554029 | 12/2004 |
| JP | 58-125084 | 7/1983 |
| JP | 4-243226 | 8/1992 |
| JP | 8-184846 | 7/1996 |
| JP | 11-337964 | 10/1999 |
| JP | 2002-14211 | 1/2002 |

OTHER PUBLICATIONS

Chinese Patent Office issued a Chinese Office Action dated Oct. 16, 2009, Application No. 2007101437275.

* cited by examiner

*Primary Examiner* — Brian Healy
(74) *Attorney, Agent, or Firm* — Young & Thompson

(57) ABSTRACT

It is to suppress the interference of the reflected light easily and securely even in a highly fine liquid crystal display device. The reflection plate comprises recessed or protruded parts and a reflection film formed over the recessed or protruded parts. A unit shape of the recessed or protruded parts is a polygon, an arbitrary point other than a centroid of the polygon that constitutes the recessed or protrude part is placed at a position that meets with an orderly-mannered lattice point as an origin, and each of the unit-shape polygons is arranged at a position that is rotated randomly with respect to the origin.

6 Claims, 11 Drawing Sheets

LIQUID CRYSTAL DISPLAY DEVICE

METHOD FOR MANUFACTURING A REFLECTION PLATE

The present Application is a Divisional of U.S. application Ser. No. 11/878,205, filed Jul. 23, 2007, now U.S. Pat. No. 7,773,173.

BACKGROUND OF THE INVENTION

1. Field of the Invention

This application is based upon and claims the benefit of priority from Japanese patent application No. 2006-211256, filed on Aug. 2, 2006, the disclosure of which is incorporated herein in its entirety by reference.

The present invention relates to a reflection plate and a liquid crystal display device and, in particular, to a reflection plate including an uneven pattern and to a liquid crystal display device of typically a transflective or reflective type, which comprises such reflection plate.

2. Description of the Related Art

With typical transmissive liquid crystal display devices such as those used for displays or monitors of notebook personal computers, it is hard to view the display in the open airs under the strong sunlight due to the light reflected by the surface of the liquid crystal display device. Therefore, transflective liquid crystal display devices have recently been employed in many cases for display units of mobile apparatuses such as mobile telephones, and digital video cameras, digital cameras, etc. The transflective liquid crystal display device uses the backlight as the light source indoors and uses the surrounding light such as the sunlight as the light source outdoors. Thus, the display can be finely viewed so that it is optimum as the displays of the mobile apparatuses or cameras. Further, the reflective liquid crystal display devices which exhibit low power consumption using no backlight are also used widely for portable game machines and the like.

Such transflective or reflective liquid crystal display device uses a reflection plate for reflecting the surrounding light. For providing the reflection plate, generally employed is a method which provides an uneven pattern inside the panel of the liquid crystal display device by using a photosensitive organic film (for example, see Japanese Unexamined Patent Publication S58-125084, pp. 4-7 and FIG. 1 (Patent Document 1) and Japanese Unexamined Patent Publication H4-243226, pp. 3-5 and FIG. 1 (Patent Document 2)). The reason for this is that: such method has a great affinity with the process (in particular, with photolithography process using resist) for fabricating a TFT (thin film transistor)-type liquid crystal display device; the process for forming the reflection plate can be achieved at a low cost; and the reflective property obtained thereby is more excellent than those obtained through other methods for forming the unevenness.

If the unevenness exhibits high regularity in such liquid crystal display device with the reflection plate including the uneven pattern, the surface of the liquid crystal display device looks shining in rainbow hues due to the interference effect of the light when strong light such as the direct sunlight is irradiated thereto. Such phenomenon becomes critical for mobile apparatuses and the like which are often used outdoors as well. Therefore, there have been various measures proposed to be taken to deal with such shortcomings.

Generation of the interference mentioned above is deeply related to the periodicity of the uneven patterns, and rainbow-like coloring is generated because the interference has the dependency on the wavelengths of the light. Thus, it is possible to lighten the interference through making the uneven pattern random, etc. For example, Japanese Unexamined Patent Publication H8-184846, pp. 3-6 and FIG. 1 (Patent Document 3) discloses a method for arranging the unevenness of the reflection plate irregularly. Further, Japanese Unexamined Patent Publication H11-337964 (Patent documents 4) and Japanese Unexamined Patent Publication 2002-142115 (Patent documents 5) disclose specific designing methods of the unevenness.

Among those, Patent Document 4 discloses a method which arranges the uneven pattern randomly and arranges the center of a recessed part or a protruded part of an uneven scatter reflection electrode at each lattice point of a tetragonal lattice or a closest-packed lattice except for a part of the lattice points. When the lattice point is actually moved randomly, there are cases where the neighboring recessed parts or the protruded parts overlap with each other as shown in FIG. 13, and the area of the overlapped protruded or recessed part becomes too large. Thus, the shape obtained thereby becomes more flattened than a desired shape, and the area effective for scattering the light is decreased. In the meantime, as shown in FIG. 3 of Patent Document 4, if the lattice points are moved randomly in such a manner that the neighboring recessed parts or protruded parts do not overlap with each other, interference of the reflected light cannot be suppressed sufficiently.

Meanwhile, Patent Document 5 discloses a method which arranges at least a part of the recessed parts or the protruded parts substantially in a helical form or substantially in a radial form. With this method, regulation of the layout is effective when there are a large number of protruded parts or the recessed parts (that is, when the uneven part is extremely small with respect to a unit pixel of the liquid crystal display device as in examples provided later) as shown in FIG. 1 of Patent Document 5 (FIG. 15 of this Application of the present invention). However, recent liquid crystal display devices have been advanced to have high-definition, and the unit pixel has become still smaller. On the other hand, it has reached to a point where the uneven pattern cannot be reduced in size due to the limit in the photolithography used for forming the unevenness. Therefore, in the highly fine liquid crystal display device, the number of the protruded parts or the recessed parts formed at the unit pixels becomes automatically smaller. Thus, the layout disclosed in the above-described Patent Documents has no effect on reducing the interference.

SUMMARY OF THE INVENTION

The present invention has been designed to overcome such shortcomings. An exemplary object of the present invention therefore is to provide a reflection plate and a liquid crystal display device capable of forming the uneven pattern which can securely suppress the interference of the reflected light.

In order to achieve the above-described exemplary object, the reflection plate according to an exemplary aspect of the invention is a reflection plate which includes recessed or protruded parts and a reflection film formed over the recessed or protruded parts: wherein a unit shape of the recessed or protruded parts is a polygon; an arbitrary point other than a centroid of the polygon that constitutes the recessed or protrude part is placed at a position that meets with an orderly-mannered lattice point as an origin; and each of the unit-shape polygons is arranged at a position that is rotated randomly with respect to the origin.

With the present invention, it is possible to form the liquid crystal display device and the reflection plate with the uneven pattern that can securely suppress the interference of the reflected light, since the present invention provides the reflection plate which includes the recessed or protruded parts and a reflection film formed over the recessed or protruded parts: wherein a unit shape of the recessed or protruded parts is a polygon; an arbitrary point other than a centroid of the polygon that constitutes the recessed or protrude part is placed at a position that meets with an orderly-mannered lattice point as an origin; and each of the unit-shape polygons is arranged while being rotated randomly with respect to the origin.

DETAILED DESCRIPTION OF EXEMPLARY EMBODIMENTS

Figure 1A:
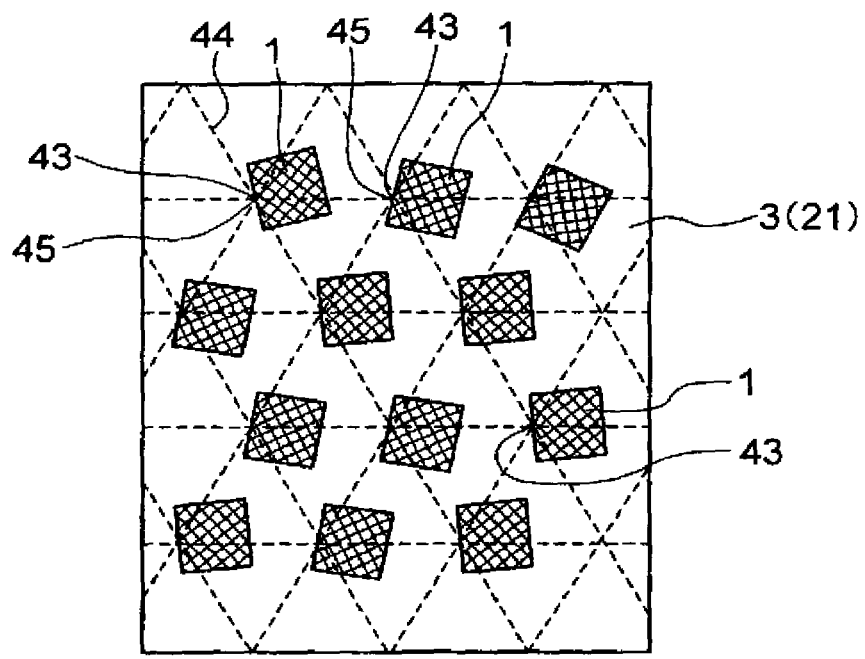
FIG. 1A is a top plan view of a reflection plate according to a first example of the present invention.
Figure 6A:
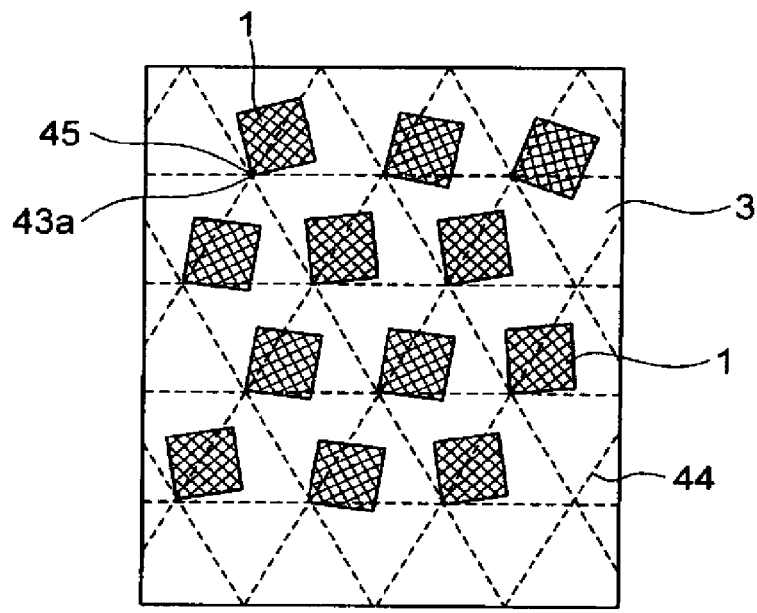
FIG. 6A is a top plan view of the reflection plate according to the first example of the present invention.
Figure 9A:
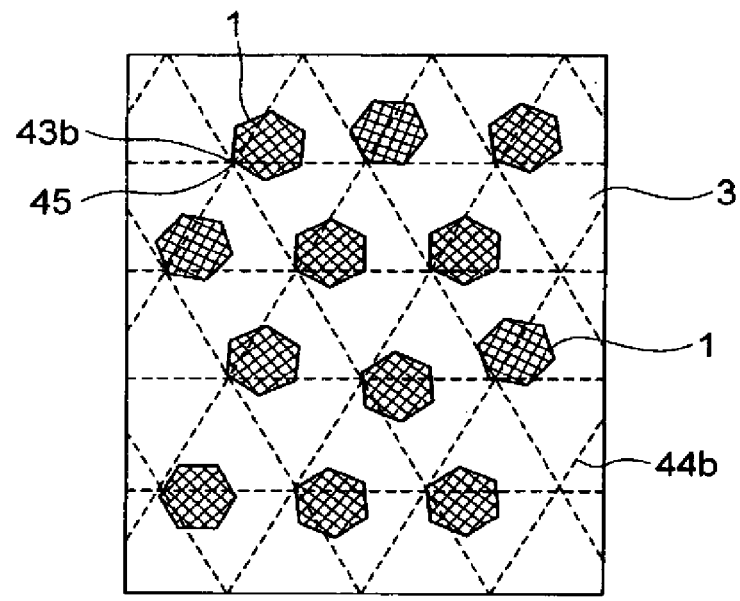
FIG. 9A is a top plan view of the reflection plate according to the first example of the present invention.

As shown in FIG. 1A, FIG. 6A, and FIG. 9A, a transflective or reflective liquid crystal display device to which the reflection plate 3 is mounted according to an exemplary embodiment of the present invention is targeted at a reflection plate 3 that includes recessed parts or protruded parts 1 and a reflection film 21 formed over the recessed or protruded parts 1, wherein: a unit shape of the recessed or protruded parts 1 is a polygon; the recessed or protruded parts 1 are arranged in such a manner that an arbitrary point (43, 43a, 43b) thereof other than the centroid of the polygon (42, 42a, 50) which constitutes the recessed or protruded parts 1 is placed at the position that meets with the position of an orderly-mannered lattice point 45 as the origin; and each unit-shape polygon (42, 42a, 50) is arranged at a position that is rotated randomly with respect to the respective origin (43, 43a, 43b). In FIG. 1A, FIG. 6A, and FIG. 9A, the areas with latticed hatching indicates the recessed or protruded parts 1.

A photomask is used for manufacturing the reflection plate according to the exemplary embodiment of the present invention. The photomask for providing the uneven pattern inside a liquid crystal panel of the liquid crystal display device by using a photosensitive organic film is formed as follows.

(1) An orderly-mannered lattice 46 is assumed to be on a photomask, an arbitrary point (the point corresponding to the single point (43, 43a, 43b) of the recessed or protruded part 1) other than the centroid of a light-shielding part 32 (which corresponds to the unit-shape polygon (42, 42a, 50) that constitutes the recessed or protruded part 1) is arranged on each lattice point 95.

(2) All the polygonal light-shielding parts 32 arranged on the lattice point 95 are moved by an arbitrary amount.

(3) Each of the polygonal light-shielding parts 32 are rotated randomly with respect to the respective lattice points 45 within such a range that the neighboring polygonal light-shielding parts 32 do not overlap with each other.

Therefore, when the reflection plate according to the exemplary embodiment of the present invention is formed by using the above-described photomask, it is formed in the following structure. That is, the unit shape of the recessed or protruded parts 1 is a polygon, and an arbitrary point (43, 43a, 93b) thereof other than the centroid of the polygon (42, 42a, 50) which constitutes the recessed or protruded part 1 is placed at the position that meets with the position of an orderly-mannered lattice point 45 as the origin, and each unit-shape polygon (42, 42a, 50) is arranged at a position that is rotated randomly with respect to the respective origin (43, 43a, 43b).

In the exemplary embodiment of the present invention, the polygons constituting the recessed or protruded parts 1 are arranged randomly. With this, coloring of the reflection plate due to the interference effect of the reflected light can be suppressed. Further, through standardizing the rotation of the polygons constituting the recessed or protruded parts 1 within such a range that the neighboring polygons do not overlap with each other, it is possible to obtain highly efficient light dispersibility. Furthermore, since the unit shape on the photomask is a polygon, the data amount can be reduced than the case of arranging a large number of circles or equilateral polygons.

Moreover, the photosensitive organic film is overexposed in an exposure step, the photosensitive organic film is heated to a temperature higher than the softening point thereof in heat treatment performed after the exposure step, or the photosensitive organic film is brought into a contact with a medical fluid or steam thereof before or after the heat treatment to make the recessed or protruded part 1 into a substantially circular shape. Thus, the light irradiated to the reflection plate can be scattered equally to all the directions, so that the uniform dispersibility can be obtained.

Normally, the recessed or protruded parts 1 can be formed finely with an organic substance. For example, novolac-based resin, acryl-based resin, or the like may be used. Further, it is desirable to add a photosensitive component to the resins from the view points of the production efficiency. The material for forming the reflection film may be any kinds that reflect the light, and those with higher reflectance are more preferable. Examples thereof may be metals such as Ag, Al, and an alloy of Ag and Al. Further, it is possible to change the reflectance of the metal at the time of forming the film by controlling the grain size of the metal, even when the same kind of metal is used. For example, the grain size can be controlled by defining the process factors such as the degree of a vacuum, sputtering power, substrate temperature or the like in the sputtering step executed in the film-forming process.

The photomask for forming the uneven pattern on the above-described photosensitive organic film has polygons as the unit shapes for forming the recessed or protruded parts, and it is manufactured through the following three steps. First, an orderly-mannered lattice is virtually provided over the photomask, and each centroid of the unit shapes is arranged at the respective lattice point. Secondly, all the unit shapes arranged on the lattice are moved by an arbitrary amount. Through this action, the centroid of the unit shape and the lattice point becomes shifted from each other. Thirdly, each of the unit shapes is rotated randomly with respect to the respective lattice point. The range of rotation is set in such a manner that the neighboring unit shapes do not overlap with each other.

Then, the photosensitive organic film is exposed, developed, and heat-treated by using the photomask to form, on the organic film, the recessed parts or protruded parts which correspond to the unit shapes arranged on the photomask. Then, a reflection film is formed thereon to obtain a complete reflection plate. The final shape of the recessed parts or the protruded parts may be in the same shape as the pattern formed on the mask. However, the shape may be changed substantially into a circular shape by overexposing (in terms of the exposure amount) the photosensitive organic film in the exposure step. Furthermore, it may be deformed substantially into a circular shape by fluidizing the organic film through heating the photosensitive organic film to a temperature higher than the softening point thereof in the heat treatment that is performed after the exposure step. As a way of another example, it may be changed substantially into a circular shape by bringing the organic film into a contact with a medical fluid that resolves the organic film or to the steam of the medical fluid before or after the heat treatment.

The reason for changing the shape of the obtained recessed parts or the protruded parts substantially into a circular shape is that it is advantageous in terms of achieving highly efficient dispersibility because the light irradiated to such reflection plate can scatter the reflected light equally to all directions. In the meantime, the reason for determining the unit shape on the photomask as a polygon is as follows. That is, the data amount is increased if a large number of circles or equilateral polygons close to a circle are provided on the mask, so that it is not preferable when forming the photomask. When the size of the unit shape on the photomask is about 3-20 μm, it is possible to obtain a substantially circular shape at last through the above-described methods even if the unit shape is in a square shape. Thus, there is no problem to have the polygonal unit shape. In the followings, this will be described more specifically by referring to the drawings. The exemplary embodiment of the present invention is akin to the reflection plate of the liquid crystal display device described above. However, the present invention also includes the configuration of a structural body including the above-described configuration (such as a scattering plate) that is targeted at a function of scattering the transmitted light, and the range and scope of the present invention is not limited to the reflection plate. Next, the reflection plate according to the exemplary embodiment of the present invention will be described in more details by referring to examples.

FIRST EXAMPLE

Figure 1B:
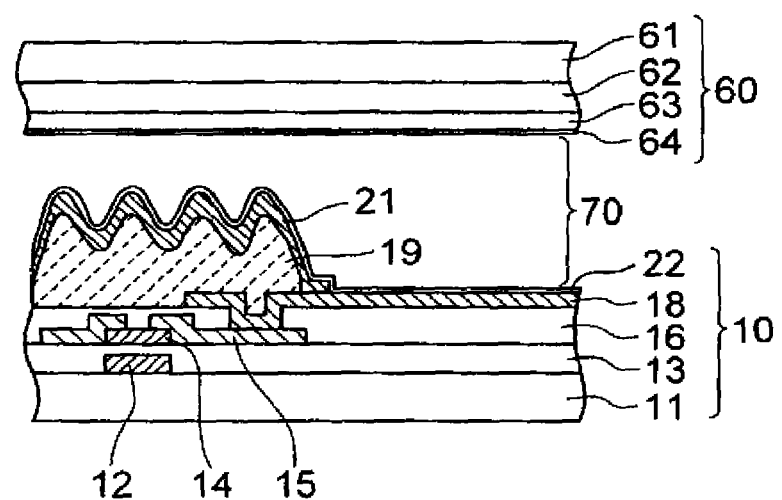
FIG. 1B is a sectional view which typically depicts the structure of one pixel in the liquid crystal display device according to the first example of the present invention.
Figure 3:
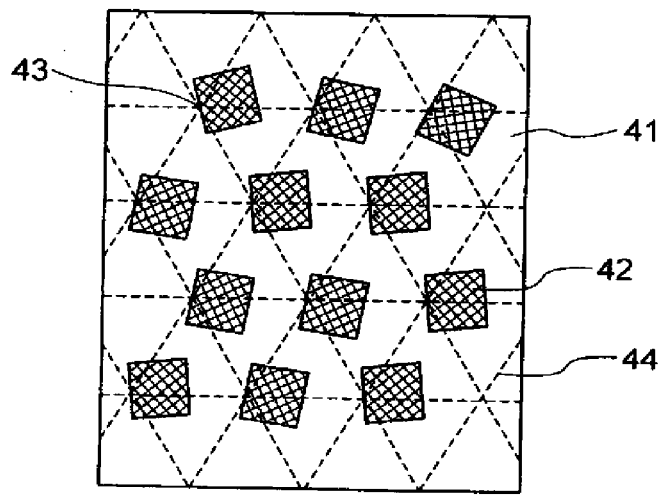
FIG. 3 is a top plan view of a photomask according to the first example of the present invention.
Figure 4:
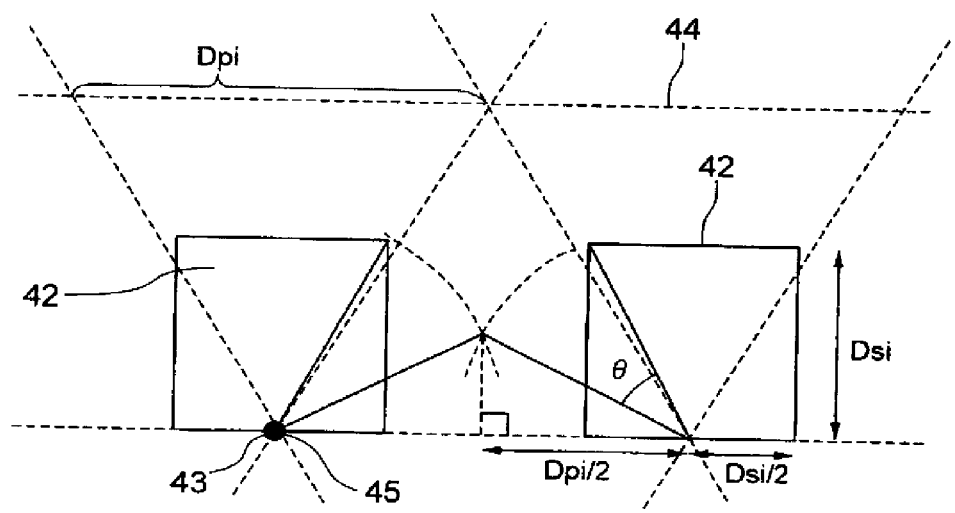
FIG. 4 is an enlarged view of the top plan view of the photomask according to the first example of the present invention.
Figure 5:
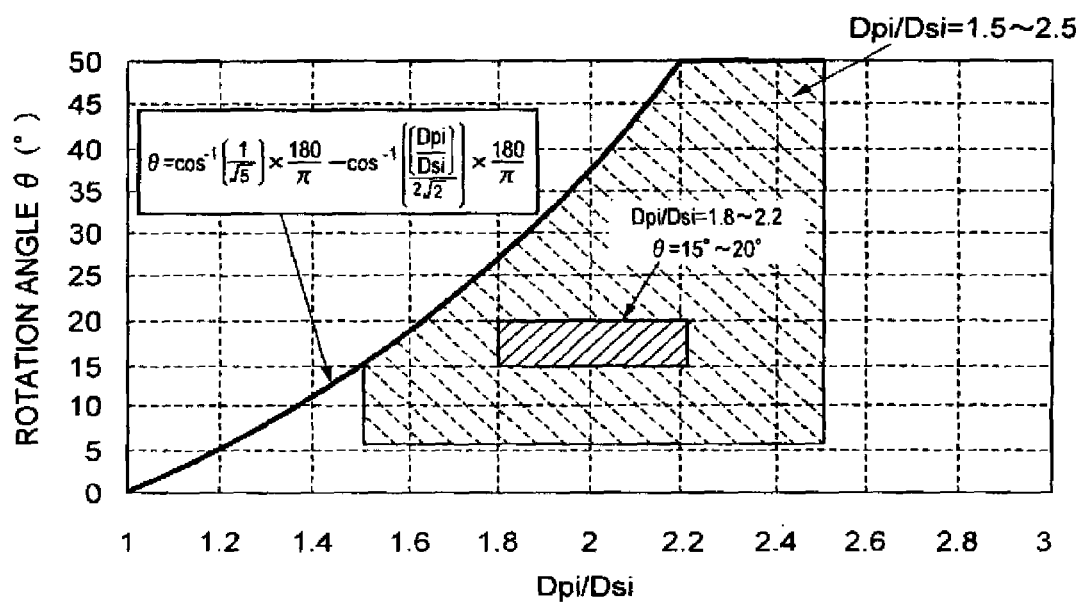
FIG. 5 is a graph for describing the relation between the designed values of the photomask according to the first example of the present invention.
Figure 12:
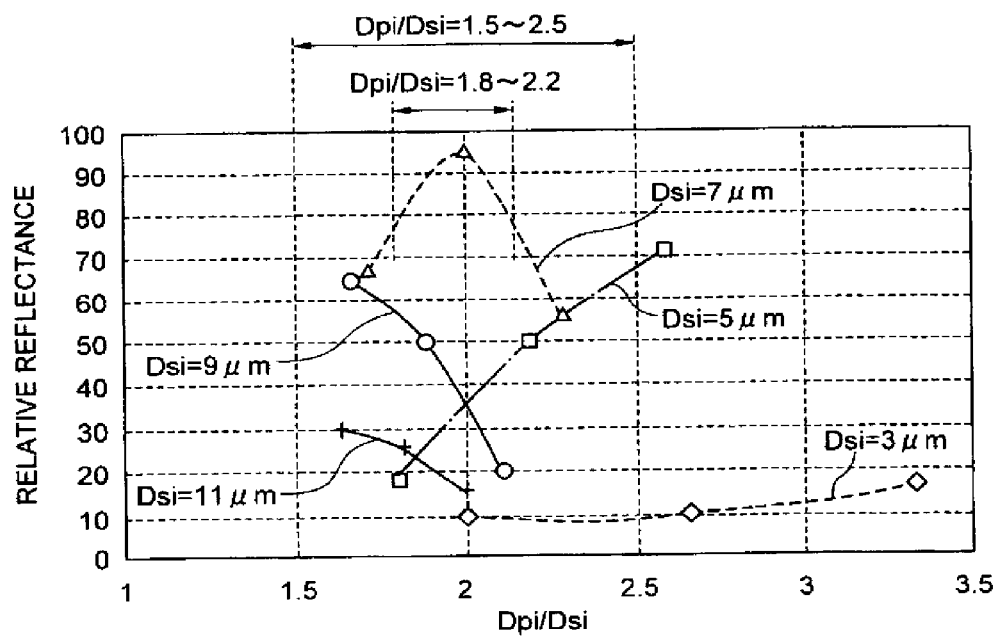
FIG. 12 is a graph for showing the relation between the reflectance and the designed values of the photomasks according to the first to third examples of the present invention.
Figure 13:
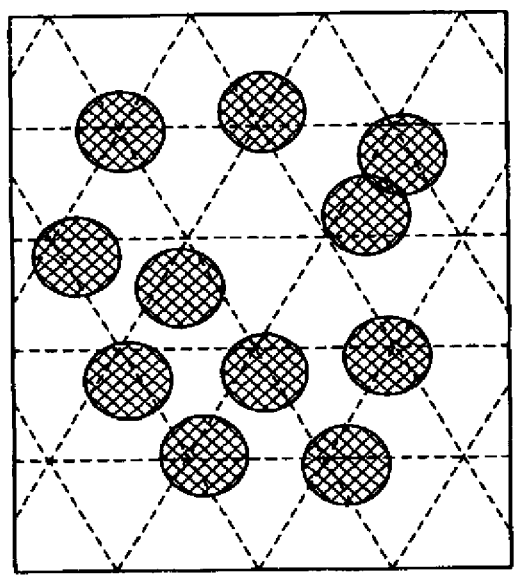
FIG. 13 is a top plan view which shows the structure of a related reflection plate.
Figure 14:
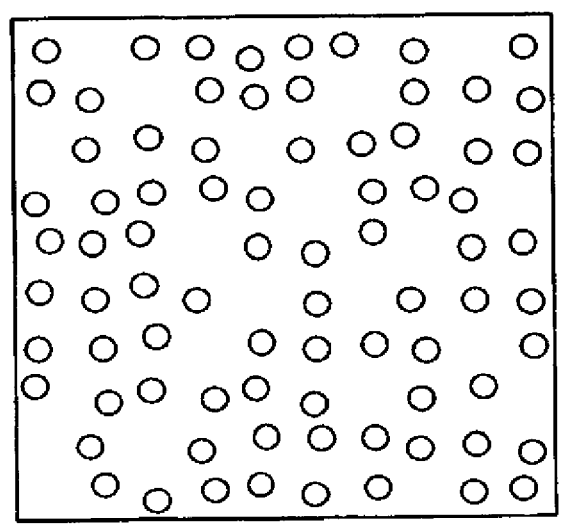
FIG. 14 is a top plan view which shows the structure of a related reflection plate.
Figure 15:
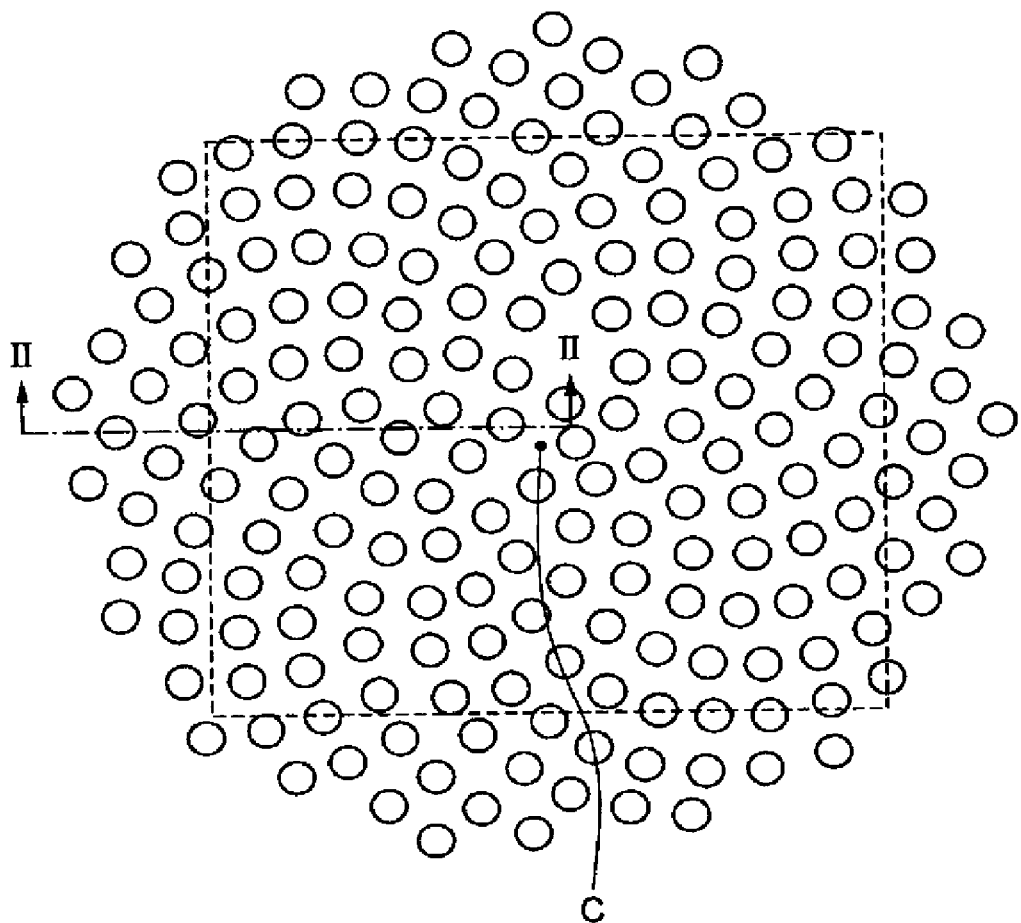
FIG. 15 is a top plan view which shows the structure of a related reflection plate.
Figure 16:
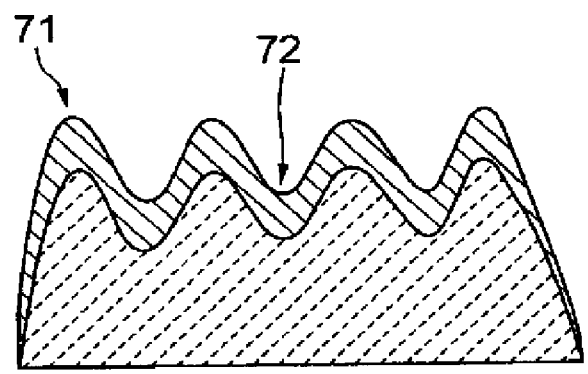
FIG. 16 is a sectional view of the reflection plate according to the first example of the present invention.

First, a reflection plate and a liquid crystal display device according to a first example of the present invention will be described by referring to FIG. 1-FIG. 5, FIG. 12, and FIG. 16. FIG. 1A is a top plan view showing the reflection plate according to the first example of the present invention, and FIG. 1B is a sectional view that schematically depicts the structure of one pixel of a transflective liquid crystal display device to which the reflection plate shown in FIG. 1A is mounted. FIG. 2 illustrates sectional views of the steps to illustrate the procedure executed for manufacturing the reflection plate on a TFT substrate. Further, FIG. 3 is a top plan view schematically depicting the structure of a photomask, FIG. 4 is an enlarged view thereof, and FIG. 5 is a graph for describing the relation between the designed values of the photomask. Furthermore, FIG. 12 is a graph showing the relation between the designed value of the photomask and the reflectance, and FIG. 16 is a sectional view of the reflection plate according to the example.

As shown in FIG. 1, the transflective liquid crystal display device including a transmission area and a reflection area includes: a substrate (referred to as a TFT substrate 10) that comprises an uneven-patterned reflection plate formed in the reflection area; another substrate (referred to as a counter substrate 60) that opposes to the TFT substrate 10; a liquid crystal 70 injected between both substrates; an optical member (not shown) arranged on the outer side of the both substrates; a backlight unit (not shown) arranged on the back side of the TFT substrate 10; and the like.

The TFT substrate 10 includes a plurality of scanning lines and a plurality of signal lines provided in a substantially orthogonal manner on a glass substrate 11, and thin film transistors (TFTs) are provided in the vicinity of the intersection points. The scanning lines are connected to a gate electrode 12, and the signal lines are connected either to a source or drain electrode 15. A pixel electrode is connected to the TFT, and it includes both a reflection film 211 and a transmission electrode 18 which are connected electrically. The TFT, the scanning line, the signal line, and the reflection film 211 of the pixel electrode are isolated by a gate insulating film 13, a passivation film 16, and an organic film 19, respectively. The uneven pattern is formed on the surface of the organic film 19, and the uneven shapes reflecting the uneven pattern of the organic film are formed on the surface of the reflection film 211. Further, the counter substrate 60 includes a color filter 62 and a black matrix (not shown) formed on a glass substrate 61, and a counter electrode 63 is formed at a position that opposes to the above-described pixel electrode. Furthermore, alignment films 22 and 64 are formed on the faces that oppose to both substrates, and the liquid crystal 70 is held between the area that is sandwiched between the alignment films 22 and 64.

Next, a manufacturing method of the TFT substrate (reflection plate) of the transflective liquid crystal display device structured as described above will be described by referring to the sectional views of the steps shown in FIG. 2.

Figure 2A:
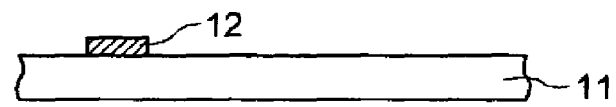
FIG. 2 illustrates sectional views showing the steps of a method for manufacturing a TFT substrate which includes the reflection plate according to the first example of the present invention.

First, as shown in FIG. 2A, metal such as Cr is deposited on a transparent insulating substrate such as a glass or plastic substrate (it is assumed to be the glass substrate 11 in this case), and the gate electrode 12 of the TFT and the scanning lines (not shown) are formed through photolithography.

Figure 2B:
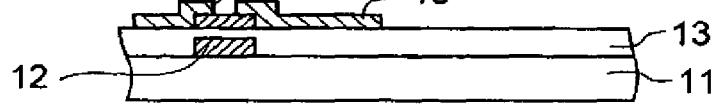

Then, as shown in FIG. 2B, a silicon nitride film is formed, for example, as the gate insulating film 13. Subsequently, an amorphous silicon film is formed as a semiconductor film, and an n+amorphous silicon film is formed as an ohmic connecting layer. Then, the amorphous silicon film and the n+amorphous silicon film are patterned into an island shape through photolithography to form a semiconductor film 14. Thereafter, a source/drain electrode 15 of the TFT and the signal lines (not shown) are formed.

Figure 2C:
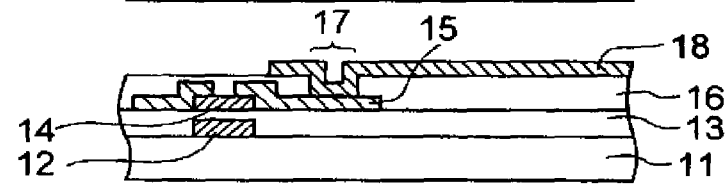

Then, as shown in FIG. 2C, the n+amorphous silicon film remained between the source and drain of the semiconductor film 14 is removed, and a silicon nitride film, for example, is formed as the passivation film 16. Thereafter, a through-hole 17 is formed in the passivation film 16 for connecting the source/drain electrode 15 and a transmission electrode 18, and indium tin oxide (ITO) film, for example, is formed as the transmission electrode 18.

Figure 2D:
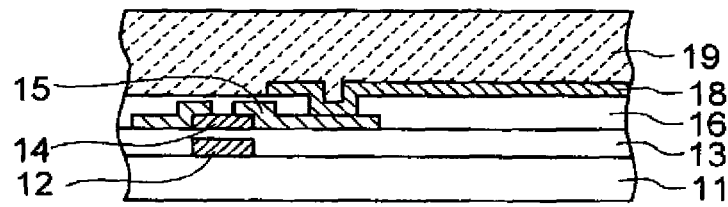

Subsequently, as shown in FIG. 2D, a positive-type photosensitive novolac resin is applied thereon over the entire surface as the organic film 19.

Figure 2E:
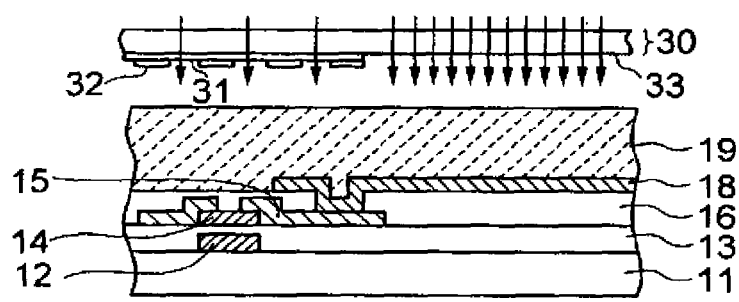
Figure 2F:
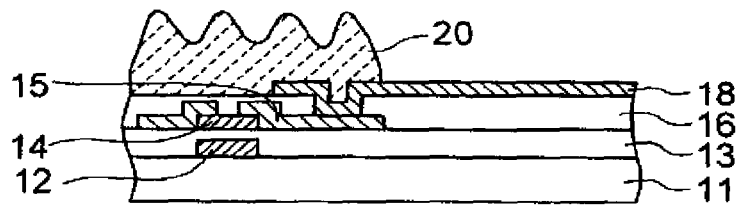

Then, as shown in FIG. 2E, the reflection area 1 and the transmission area 2 are exposed for a proper exposure amount, respectively, by using a photomask 30 that is used for forming the uneven pattern. The photomask 30 is formed with a light-shielding part 32, a transflective part 31, and a transmissive part 33, and the organic film 19 is patterned as in FIG. 2F into an uneven film 20. The detailed structure of the photomask 30 and the forming method of the uneven film 20 will be described later.

Figure 2G:
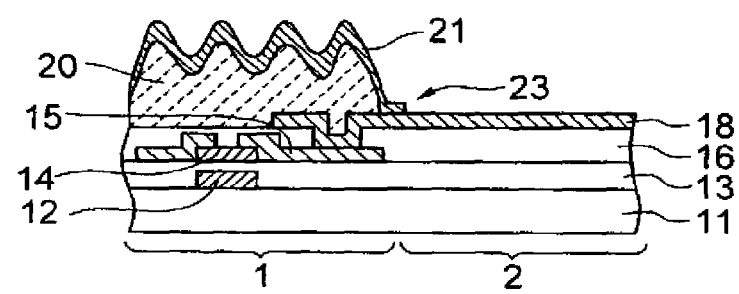

Subsequently, as shown in FIG. 2G, molybdenum and aluminum are formed into a film, for example, as the reflection film 211. Molybdenum and aluminum are used as a barrier film for suppressing the battery reaction of the ITO film. Then, molybdenum and aluminum are patterned by photolithography to form the reflection film 211 on the uneven film 20. At that time, the reflection film 211 and the transmission electrode 18 functioning as the reflection electrode are electrically connected via an electrode connecting part 23. The obtained reflection plate has the reflection film 211 whose surface reflects the minute uneven pattern formed on the organic film 19 provided underneath. Considering the plane distributions of the uneven pattern, the positions of each protruded part are slightly shifted from the lattice points of the closest-packed lattice randomly. However, a single lattice point essentially corresponds to a single protruded part.

A novolac-based resin is used as the organic film 19 in this case. However, there is no problem to use an acryl-based resin or other photosensitive resins. Also, the organic film may have a translucent characteristic. Further, an alloy of aluminum and neodymium, silicon, or the like may be used for the reflection film 211 instead of aluminum used herein, and there is no problem to use silver or silver alloy. Furthermore, even though molybdenum used herein for the barrier metal, there is no problem to use other metal such as titanium or chrome. Moreover, a barrier film is not required in the case where a metal or alloy that is hard to have battery reaction with the ITO film is used as the reflection film 211.

Thereafter, as shown in FIG. 1B, the alignment film 22 is applied on the completed TFT substrate 10. The counter substrate 60 to which the alignment film 64 is applied in the same manner is placed over the TFT substrate 10 via a spacer (not shown) for forming a gap, and the liquid crystal 70 is injected between both substrates to seal the periphery thereof with a sealing material (not shown). Then, a polarizing plate is laminated on both sides of the substrates to complete the liquid crystal display device. It is necessary to provide a gap difference between the transmission part and the reflection part such that a phase difference in the completed transmission part becomes ¼ wavelength and a phase difference in the reflection part becomes ½ wavelength. In order to control the difference, the average height of the photosensitive resin to which the uneven pattern is formed is adjusted in advance with respect to the ITO film of the transmission part.

Then, details of designing the photomask used for fabricating the reflection plate including the uneven pattern will be described by referring to FIG. 3 which schematically illustrates a part of the photomask. A photomask 41 shown in FIG. 3 is constituted with a mask material such as glass. Light-shielding parts (32) for forming the recessed or protruded parts 1 of the reflection plate 3 shown in FIG. 1A is provided on the photomask 41, and the light-shielding parts (32) are placed as squares 42 on the photomask 41. The size of one side of the square 42 is about 7 μm, and each square 42 is arranged in such a manner that a middle point 43 of one side of the square 42 meets with the lattice point of a closest-packed lattice 44. Further, each of the squares 42 is rotated by random angles with respect to the middle point 43 of one side of the square 42. Each square 42 in FIG. 3 corresponds to the light-shielding part 32 of FIG. 2E, and other parts correspond to the transflective part 31 of FIG. 2E. The light-shielding part 32 of the photomask 41 constitutes the recessed or protruded part 1 of the reflection plate 3.

As shown in FIG. 4, it is assumed herein that the size of one side of the square 42 is Dsi, and the distance between the lattice points of the closest-packed lattice 44 is Dpi. FIG. 12 shows the relation between the reflectance of the recessed or protruded part 1 of the reflection plate 3 and the Dpi/Dsi within a defined range, when the reflection plate 3 shown in FIG. 1A is manufactured by using the photomask 41. It can be seen from FIG. 12 that the ratio of Dpi/Dsi is about 1.5-2.5, and it is possible to obtain the relative reflectance (the reflectance when the reflectance of a standard white plate is considered 100%) of the reflection film 211 formed on the recessed or protruded parts 1 of the reflection plate as high as about 60% or more when the range of Dsi is about 5-9 μm.

Further, by referring to FIG. 5, there is described the set range of an absolute value θ of the rotation angle, assuming that the case where the square 42 in FIG. 4 is rotated in the clockwise direction with respect to the middle point of one side thereof as the origin is "+", and the case where it is rotated in the counterclockwise direction is "−". FIG. 5 is a graph for showing the relation between Dpi/Dsi and the angle at which the neighboring squares do not overlap with each other when the squares 42 as the light-shielding parts 32 of the photomask 41 are rotated. It can be seen from FIG. 5 that the range with which the neighboring squares do not overlap with each other and do not have too much space therebetween (that is, the range with which there is no flat part formed after exposure, development, and baking) is as follows. That is, the ratio of Dpi/Dsi is about 1.5-2.5, and the angle for the square 42 to be rotated is the part lower than the graph line within the illustration. In other words, it is the range where θ is about 5 degrees or more (the hatching area in the graph). This is because if the absolute value of the angle for rotating the squares randomly is 5 degrees or less, the moving range of the squares 42 is too small so that the regularity of the layout is to be remained. Thus, the effect of interference reduction becomes weakened.

When the reflection plate 3 is manufactured by using the photomask 41 shown in FIG. 3, the reflection plate 3 is formed including the recessed or protruded parts 1 and the reflection film 21 formed thereon, as shown in FIG. 1A. It is formed in such a manner that: the unit shape of the recessed or protruded parts 1 is a polygon; an arbitrary point (43a) other than the centroid of the polygon (42a) that constitutes the recessed or protruded part 1 is placed at the position that meets with the orderly-mannered lattice point 45 as the origin; and each of the unit-shape polygons (42a) is arranged at a position that is rotated randomly with respect to the origin (43a). In FIG. 6A, the areas with latticed hatching indicate the recessed or protruded parts 1, which are formed by the light-shielding parts (32) of the squares 42a on the photomask 41.

Therefore, when the rotation angle of the squares 42 on the photomask 41 and Dpi/Dsi are set within the above-described ranges, the neighboring squares constituting the recessed or protruded parts 1 of the reflection plate 3 do not overlap with each other. Thus, the regular reflection component of the reflection plate 3 is decreased and, further, the interference of the light is decreased due to the random rotation, thereby improving the dispersibility of the reflection plate 3. As a result, it is possible to obtain an excellent display characteristic with suppressed coloring and having no roughness on the liquid crystal display device to which the reflection plate 3 is mounted. From the result of the experiment, it is more desirable to set the ratio of Dpi/Dsi as about 1.8-2.2 and the absolute value of the angle for the square 42 to be rotated as about 15-20 degrees (the area surrounded by a frame in the graph). With this, the relative reflectance in the recessed or protruded parts 1 on the reflection plate 3 in FIG. 12 becomes about 80% or more, so that still higher effect can be achieved.

It is desirable for the shape of the recessed or protruded parts 1 of the reflective plate 3 to be a circle. The reason for this is that it is possible to obtain the equivalent reflectance for all the directions when the shape of the recessed or protruded parts 1 is a circle. However, there is such a technical problem that the data amount for forming the mask becomes too large when a large number of circular patterns are to be formed on the exposure photomask 41 that is used for fabricating the reflection plate. This technical problem is reflected upon the cost. Therefore, in this example of the present invention, the unit shape on the photomask 41 for forming the uneven pattern is set as the polygon of four to six sides including a smaller data amount. At the same time, the manufacturing method is devised such that the unit shape of the completed reflection plate becomes substantially a circle even if the unit shape on the photomask 41 is a polygon. The details thereof will be disclosed hereinafter.

The photomask 41 has a unit shape of polygons for forming the protruded parts in order to manufacture the protruded parts (or recessed parts) 1 of the reflection plate 3. The steps for exposing and developing the photosensitive organic film are performed by using the photomask 41. At this point, the protruded parts in the reflection area 1 are in the shape that almost corresponds to the square 42 of the photomask 41. Thus, in this example, the step for making the shape of the protruded parts (or the recessed parts) 1 of the reflection plate 3 into a substantially circular shape is executed by heat treatment. By baking the reflection plate 3 at about 100-300° C. (for example, 120° C.) as the heat treatment after development, the angular parts of the polygons of the protruded parts (or the recessed parts) 1 of the reflection plate 3 are melted by heat and rounded almost into a circular shape. Thereafter, the photosensitive organic film is heat-treated at about 250° C. for curing. Even though the heat treatment herein is performed twice separately for baking and curing, both can be executed in one-time treatment. Further, it is also possible to round off the angular parts of the polygons into a substantially circular shape through overexposing (in terms of the exposure amount) the photosensitive organic film in the exposure step.

FIG. 16 illustrates the reflection plate of this example. Protrude parts 71 in FIG. 16 are formed with the squares 42a of the photomask 41 (that is, formed with the light-shielding parts), and recessed parts 72 are formed with the part other than the square parts 42a of the photomask 41.

In the example described above, the closest-packed lattice is referred as an example of the orderly-mannered lattice. However, other lattice such as a tetragonal lattice may also be used instead. Further, although the shapes of the squares 42 as the light-shielding parts 32 of the photomask 41 are all set as the same polygons in this example, the squares 42 may be in two or more kinds of sizes or may be two or more kinds of different polygons. When the square shapes on the photomask 41 are changed in the manner described above, the polygons as the unit shape of the recessed or protrude parts 1 on the reflection plate 3 are changed in the same manner accordingly. Furthermore, although the transmittance of the light-shielding parts 32 as the squares 42 of the photomask 41 is either 100% or 0% in this example, there may be two or more kinds of transmittance such as 75% and 50%. Moreover, a part of the squares 42 as the shapes of the light-shielding parts 32 on the photomask 41 may be eliminated randomly.

SECOND EXAMPLE

Figure 6B:
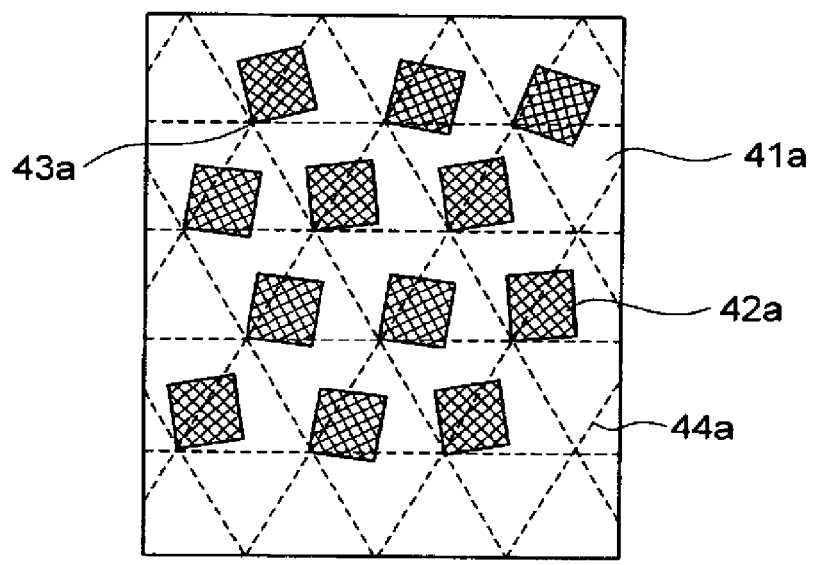
FIG. 6B is a top plan view of a photomask according to a second example of the present invention.
Figure 7:
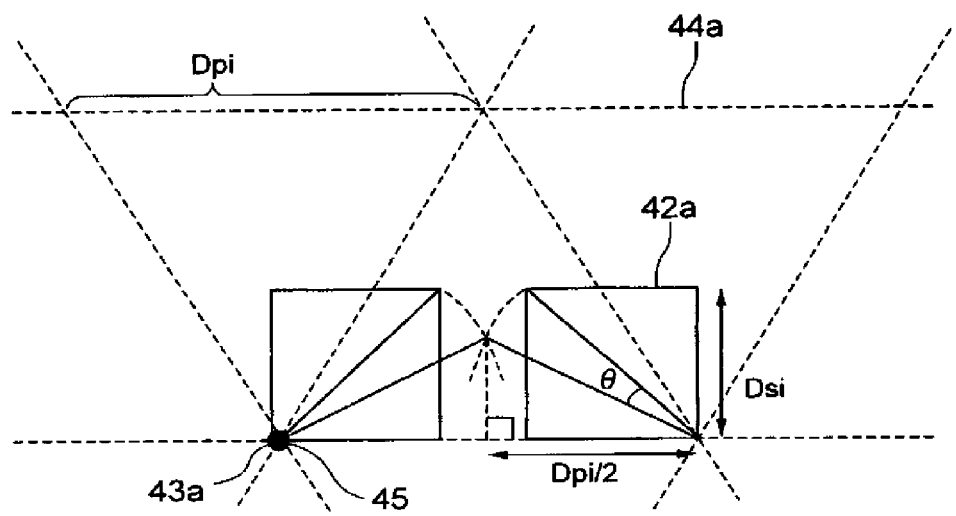
FIG. 7 is an enlarged view of the top plan view of the photomask according the second example of the present invention.
Figure 8:
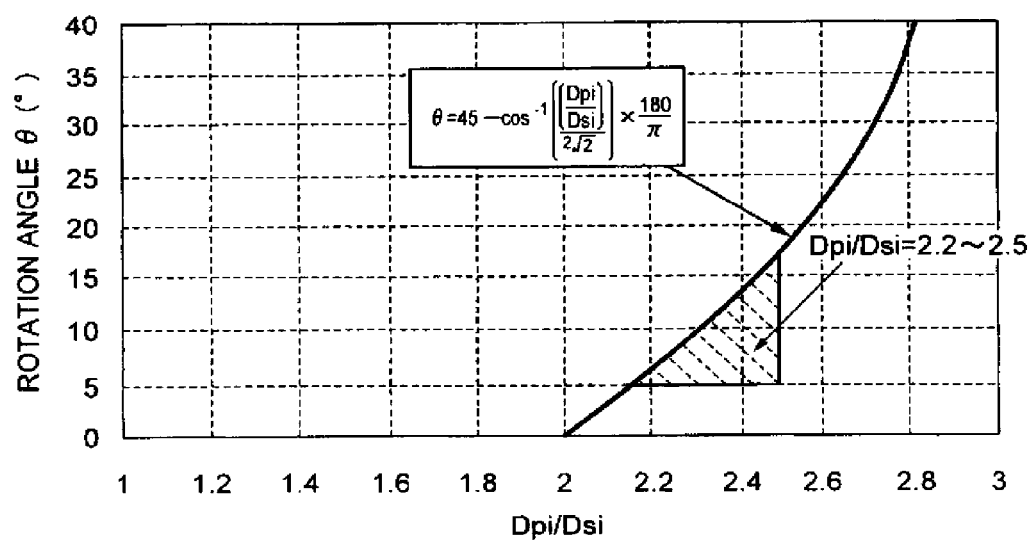
FIG. 8 is a graph for describing the relation between the designed values of the photomask according to the second example of the present invention.

Next, a reflection plate and a liquid crystal display device according to a second example of the present invention will be described by referring to FIG. 6-FIG. 8. FIG. 6A is a top plan view showing the reflection plate according to the second example of the present invention, and FIG. 6B is a top plan view showing the photomask according the second example of the present invention. FIG. 7 is an enlarged view in which a part of the photomask shown in FIG. 6B is enlarged. FIG. 8 is a graph for describing the relation between the designed values of the photomask. The second example illustrates another example of the photomask. Specifically, the position of the origin in this example is the vertex of a square, while it is the middle point of one side of the square in the first example. The manufacturing method of the liquid crystal display device other than the photomask is the same as that of the first example, so that the explanation thereof will be omitted herein.

By referring to FIG. 6B, there is described the details of designing the photomask that is used in the second example for fabricating the reflection plate including an uneven pattern. As shown in FIG. 6B, light-shielding parts (32) for forming the recessed or protruded parts 1 of the reflection plate 3 shown in FIG. 6A are provided on a photomask 41a, and the light-shielding parts (32) are disposed as squares 42a on the photomask 41a. The size of one side of the square 42a is about 7 μm, and each square 92a is arranged in such a manner that a vertex 43a of the square 42a meets with the lattice point of the closest-packed lattice 44a. Further, each of the squares 42 is rotated by random angles with respect to the vertex 43a of the square 42a as the origin.

When the reflection plate 3 is manufactured by using the photomask 41a shown in FIG. 6B, the reflection plate 3 is formed including the recessed or protruded parts 1 and the reflection film 21 formed thereon, as shown in FIG. 6A. It is formed in such a manner that: the unit shape of the recessed or protruded parts 1 is a polygon; an arbitrary point (43a) other than the centroid of the polygon (42a) that constitutes the recessed or protruded part 1 is placed at the position that meets with the orderly-mannered lattice point 45 as the origin, and each of the unit-shape polygons (42a) is arranged at a position that is rotated randomly with respect to the origin (43a) respectively. In FIG. 6A, the areas with latticed hatching indicate the recessed or protruded parts 1, which are formed by the light-shielding parts (32) of the squares 42a on the photomask 41a.

By referring to FIG. 8, there is described the set range of an absolute value θ of the rotation angle, assuming that the case where the vertex 43a of the square 42a of the photomask 41a is taken as the origin in FIG. 7 and the square 42a of the photomask 41a is rotated in the clockwise direction with respect to the origin is "+", and the case where it is rotated in the counterclockwise direction is "−". FIG. 8 is a graph for showing the relation between Dpi/Dsi and the angle at which the neighboring squares do not overlap with each other when the squares 42a on the photomask 41a are rotated. It can be seen from FIG. 8 that the range with which the neighboring squares do not overlap with each other and do not have too much space therebetween is as follows. That is, the ratio of Dpi/Dsi is about 2.2-2.5, and the angles for the square 42a to be rotated is the part lower than the graph line within the illustration. In other words, it is the range where θ is about 5 degrees or more (the hatching area in the graph). By setting those ranges, the flat part can be reduced.

As described above, the same effects can be obtained by setting the origin as the vertex 43a of the square 42a, even though the set range of the absolute value θ of the rotation angle becomes narrower than the case of the first example where the middle point of one side of the square is taken as the origin. It is noted that the origin is not limited to the vertex or the middle point of a side of the polygon as described above as a way of example but it can also be set at an arbitrary point that is other than the centroid.

THIRD EXAMPLE

Figure 9B:
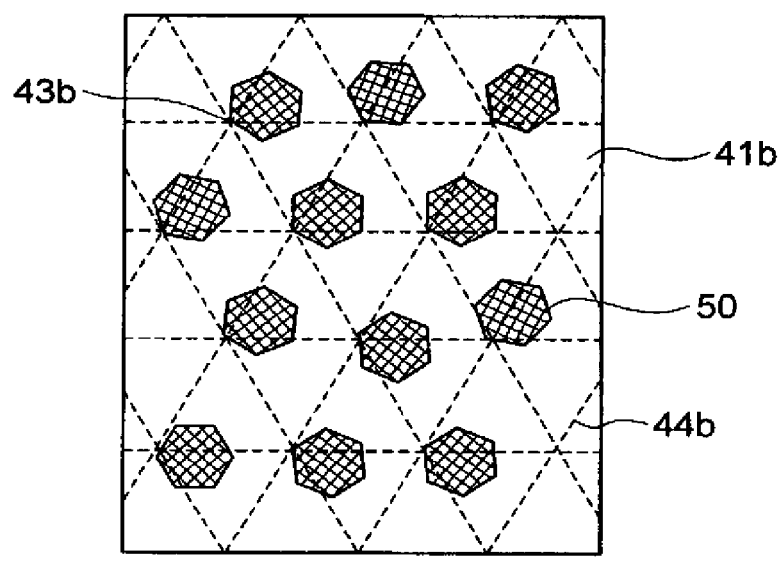
FIG. 9B is a top plan view of a photomask according to a third example of the present invention.
Figure 10:
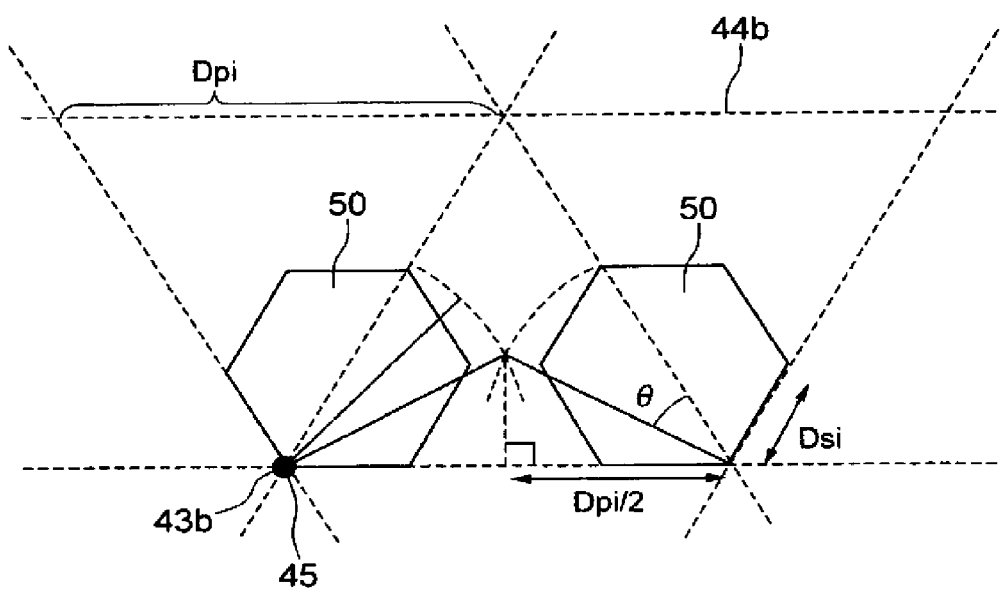
FIG. 10 is an enlarged view of the top plan view of the photomask according the third example of the present invention.
Figure 11:
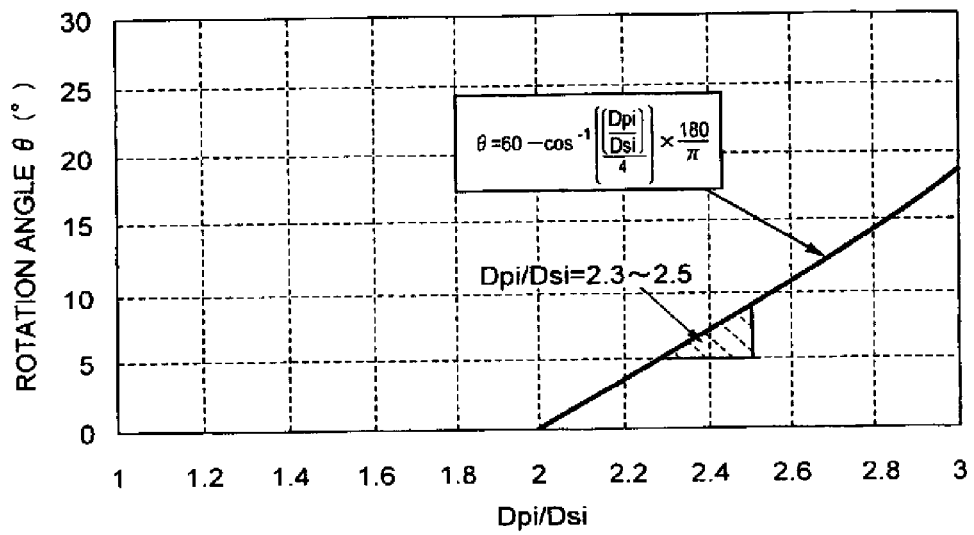
FIG. 11 is a graph for describing the relation between the designed values of the photomask according to the third example of the present invention.

Next, a reflection plate and a liquid crystal display device according to a third example of the present invention will be described by referring to FIG. 9-FIG. 11. FIG. 9A is a top plan view of the reflection plate according to the third example of the present invention, and FIG. 9B is a top plan view of the photomask according the third example of the present invention. FIG. 10 is an enlarged view in which a part of the photomask shown in FIG. 9B is enlarged. Further, FIG. 11 is a graph for describing the relation between the designed values of the photomask. The third example also illustrates still another example of the photomask. Specifically, while the unit shape of the recessed or protruded parts 1 in the reflection plate 3 according to the first example is set as a square, it is set as a hexagon in the third example. The manufacturing method of the liquid crystal display device other than the photomask is the same as that of the first example, so that the explanation thereof will be omitted herein.

By referring to FIG. 9B, there is described the details of designing the photomask that is used in the third example for fabricating the reflection plate including an uneven pattern. As shown in FIG. 9B, light-shielding parts (32) for forming the recessed or protruded parts 1 of the reflection plate 3 shown in FIG. 9A are provided on a photomask 41b, and the light-shielding parts (32) are disposed as hexagons 50 on the photomask 41b. The size of one side of the hexagon 50 is about 7 μm, and each hexagon 50 is arranged in such a manner that a vertex 43b of the hexagon 50 meets with the lattice point of the closest-packed lattice 44b. Further, each of the hexagons 50 is rotated by random angles with respect to the vertex 43b of the hexagon 50 as the origin.

When the reflection plate 3 is manufactured by using the photomask 41b shown in FIG. 9B, the reflection plate 3 is formed including the recessed or protruded parts 1 and the reflection film 21 formed thereon, as shown in FIG. 9A. It is formed in such a manner that: the unit shape of the recessed or protruded parts 1 is a polygon; an arbitrary point (43b) other than the centroid of the polygon (50) that constitutes the recessed or protruded part 1 is placed at the position that meets with the orderly-mannered lattice point 45 as the origin, and each of the unit-shape polygons (50) is arranged at a position that is rotated randomly with respect to the origin (43b). In FIG. 9A, the areas with latticed hatching indicate the recessed or protruded parts 1, which are formed by the light-shielding parts (32) of the hexagons 50 on the photomask 41b.

By referring to FIG. 11, there is described the set range of an absolute value θ of the rotation angle, assuming that the case where the hexagon 50 of FIG. 10 is rotated in the clockwise direction with respect to the vertex 43b thereof as the origin is "+", and where it is rotated in the counterclockwise direction is "−". It is assumed here that the size of one side of the hexagon 50 is Dsi, and the distance between the lattice points of the closest-packed lattice 44b is Dpi. FIG. 11 is a graph for showing the relation between Dpi/Dsi and the angle at which the neighboring hexagons do not overlap with each other when the hexagons 50 are rotated. It can be seen from FIG. 11 that the range with which the neighboring hexagons do not overlap with each other and do not have too much space therebetween is as follows. That is, the ratio of Dpi/Dsi is about 2.3-2.5, and the angles for the hexagons 50 to be rotated is the part lower than the graph line within the illustration. In other words, it is the range where θ is about 5 degrees or more.

The same effects can also be obtained even when using other polygons than a square or hexagon as the unit shapes. Further, it is also possible to use different shapes such as squares and hexagons as the unit shapes on a single reflection plate. Furthermore, the use of the unit shapes in different sizes at random within a single reflection plate can increase the irregularity. It is also possible to change the height of the protruded parts within the reflection plate through changing the transmittance of the unit shapes on the photomask as a way to increase the irregularity. This is achieved because of the following reasons. That is, the organic film in the part with high transmittance is subjected to a large amount of exposure, so that the height of the protruded part becomes short. Meanwhile, the organic film in the part with low transmittance is subjected to a small amount of exposure, so that the height of the protruded part remains high. It is also possible to increase the irregularity further through a combination of those methods.

FOURTH EXAMPLE

Next, a reflection plate and a liquid crystal display device according to a fourth example of the present invention will be described. It is the same as the case of the first example until the step of exposing and developing a photosensitive organic film by using the same photomask as that of the first example. Thereafter, the organic film is exposed to the atmosphere of an organic solvent to make the protruded part of the organic film into a substantially circular shape. As the organic solvent, it is suitable to use acetone, for example, which has high vapor pressure and exhibits high fusibility for the organic film. For that treatment, it is effective to heat the organic solvent so as to generate the vapor easily. Then, the organic film is heat-treated at 250° C. for curing. Furthermore, after development, the organic film may be baked at about 100° C. before being exposed to the organic solvent, in order to increase the adhesive property of the organic film to the glass substrate. It is noted that the medical fluid to be used is not limited to acetone, and the organic film may be directly brought into contact with a medical fluid as well.

FIFTH EXAMPLE

Next, a reflection plate and a liquid crystal display device according to a fifth example of the present invention will be described. The first to fourth examples have been described by referring to the case where the substantially circular protrude parts are formed on the reflection plate. However, it is also possible to form substantially circular recessed parts. In that case, the photomask including the same pattern as that of the first example may be used by inverting the black and white. Alternatively, it is possible to form the recessed parts by using the same photomask as that of the first example with the use of a negative-type photosensitive organic film instead of using the positive-type photosensitive organic film.

The examples have been described by referring to the case of a transflective liquid crystal display device including the reflection area 1 and the transmission area 2. However, the present invention can also be applied in the same manner to a reflective liquid crystal display device that only has a reflection part.

The present invention can be utilized as a reflection plate for scattering the surrounding light and for a transflective or reflective liquid crystal display device which includes the reflection plate.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A manufacturing method of a reflection plate which includes recessed or protruded parts and a reflection film formed over the recessed or protruded parts, wherein a photosensitive organic film is exposed, developed, and baked by using a mask that is formed in such a manner that: a polygon for forming the recessed or protruded parts is set as a unit shape; an arbitrary point other than a centroid of the polygon that constitutes the recessed or protrude part is taken as an origin, and the unit shape is placed such that the origin meets with an orderly-mannered lattice point; and each of the unit-shape polygons is arranged while being rotated randomly with respect to the origin, and the reflection film is formed over the recessed or protruded parts which have been exposed, developed, and baked.

2. The manufacturing method of the reflection plate as claimed in claim 1, wherein the recessed or protruded parts are formed into a substantially circular shape by applying heat treatment after the development.

3. The manufacturing method of the reflection plate as claimed in claim 2, wherein the heat treatment is performed at a temperature of about 100-300° C.

4. The manufacturing method of the reflection plate as claimed in claim 1, wherein the recessed or protruded parts are formed into a substantially circular shape by being exposed to a medical fluid, vapor of the medical fluid, or both after the development.

5. The manufacturing method of the reflection plate as claimed in claim 1, wherein Al, Ag, or an alloy of Al and Ag is used for the reflection film.

6. The manufacturing method of the reflection plate as claimed in claim 1, wherein two or more kinds of transmittance are set for the unit shapes on the mask.

* * * * *